United States Patent
Danielsson

(10) Patent No.: US 9,979,621 B2
(45) Date of Patent: May 22, 2018

(54) METHOD IN A COMMUNICATION NETWORK

(71) Applicant: NET INSIGHT INTELLECTUAL PROPERTY AB, Stockholm (SE)

(72) Inventor: Magnus Danielsson, Stocksund (SE)

(73) Assignee: NET INSIGHT INTELLECTUAL PROPERTY AB, Stockholm (SE)

( * ) Notice: Subject to any disclaimer, the term of this patent is extended or adjusted under 35 U.S.C. 154(b) by 108 days.

(21) Appl. No.: 14/965,068

(22) Filed: Dec. 10, 2015

(65) Prior Publication Data
US 2016/0173352 A1 Jun. 16, 2016

(30) Foreign Application Priority Data

Dec. 12, 2014 (SE) ...................................... 1451533

(51) Int. Cl.
*H04L 12/26* (2006.01)
*H04L 29/06* (2006.01)
(Continued)

(52) U.S. Cl.
CPC ........ *H04L 43/0864* (2013.01); *H04J 3/0676* (2013.01); *H04J 3/14* (2013.01);
(Continued)

(58) Field of Classification Search
CPC ............. H04L 43/0864; H04L 63/1408; H04L 41/064; H04L 9/00; H04J 3/14;
(Continued)

(56) References Cited

U.S. PATENT DOCUMENTS

| 4,142,069 A * | 2/1979 | Stover ................... H04J 3/0647 370/507 |
| 2009/0222589 A1* | 9/2009 | Kirsch ..................... G04G 5/00 709/248 |
| 2016/0094335 A1* | 3/2016 | Roberts ..................... H04L 7/04 375/356 |

FOREIGN PATENT DOCUMENTS

WO    WO 2011/154046 A1 * 12/2011

OTHER PUBLICATIONS

Gurewitz et al: "Network Classless Time Protocol Based on Clock Offset Optimization", IEEE I ACM Transactions on Networking, IEEE I ACM, New York, NY, US, vol. 14, No. 4, Aug. 1, 2006 (Aug. 1, 2006), pp. 876-888.*

(Continued)

*Primary Examiner* — Mohammad Adhami
*Assistant Examiner* — Shailendra Kumar
(74) *Attorney, Agent, or Firm* — Harness, Dickey & Pierce, P.L.C.

(57) ABSTRACT

A method to provide a cyber attack resistant and fault tolerant precision clocking scheme for wide area critical infrastructure networks through what is called Distributed Time Source Validation, DTSV, is provided, which is a distributed algorithm and signaling mechanism for a network to detect a compromised time source or sources in a multiple master clock system. The method includes providing a local clock signal, receiving in a node R1 an external clock signal from an external source, C or S1, estimating based on the local clock signal and the external clock signal timing parameters associated with the first node and the external source, comparing the timing parameters to detect any Mutual Clock Discrepancy (MCD) between the first node and the external source, and distributing any detected MCD in the network.

14 Claims, 3 Drawing Sheets

(51) Int. Cl.
  *H04L 12/24* (2006.01)
  *H04J 3/14* (2006.01)
  *H04J 3/06* (2006.01)
(52) U.S. Cl.
  CPC ........ *H04L 41/064* (2013.01); *H04L 63/1408* (2013.01); *H04J 3/0641* (2013.01); *H04J 3/0644* (2013.01); *H04J 3/0682* (2013.01)
(58) Field of Classification Search
  CPC ...... H04J 3/0676; H04J 3/0641; H04J 3/0682; H04J 3/0644
  See application file for complete search history.

(56) References Cited

OTHER PUBLICATIONS

Mills D L: "Improved Algorithms for Synchronizing Computer Network Clocks", IEEE I ACM Transactions on Networking, IEEE I ACM, New York, NY, US, vol. 3, No. 3, Jun. 1, 1995 (Jun. 1, 1995), pp. 245-254.*

* cited by examiner

METHOD IN A COMMUNICATION NETWORK

PRIORITY STATEMENT

The present application hereby claims priority under 35 U.S.C. § 119 to Swedish patent application number SE 1451533-2 filed Dec. 12, 2014, the entire contents of which are hereby incorporated herein by reference.

TECHNICAL FIELD

The present invention relates to the field of communication network system for node-to-node transmission of data, and more particularly to a method for providing time source validation in a distributed network with multiple sources and multiple paths.

BACKGROUND OF THE INVENTION

In recent years, substantial attention has been directed to real time communication over packet switched communication networks like the Internet. In real time communication, such as audio and video streaming, timeliness and low latency can be more important than reliability of the packet streaming/transport. New network technologies for precise timing, including IEEE 1588, have proven to provide sufficient absolute time clocking for large area networks, LAN, and metro deployments, but have not proven to be scalable and accurate for wide area networks, WAN, and do not have the capability of comparing disparate, topologically disassociated timing sources, which in some circumstances is required to detect a faulty clock. Also, it has been demonstrated that vulnerabilities of these technologies leave networks open to cyber attacks, such as GPS clock jamming and spoofing. Hence, there is a need for a complementary solution that resolves these existing issues.

SUMMARY OF THE INVENTION

In view of the above identified problem, an object of the present invention is to at least provide an improved method for packet based network system and node-to-node transmission of data packets.

An object of the invention is to provide a method to provide a cyber attack resistant and fault tolerant precision clocking scheme for wide area critical infrastructure networks through what is called Distributed Time Source Validation (referred to herein as "DTSV"). DTSV is a distributed algorithm and signaling mechanism for a network to detect a compromised time source or sources in a multiple master clock system, as the result of either a network fault or failure or a malicious cyber attack.

According to an aspect of the invention, there is provided a method in a network system capable of node-to-node time-transfer. The method comprises providing a local clock signal, receiving in a first node an external clock signal from an external source, estimating based on the local clock signal and the external clock signal timing parameters associated with the first node and the external source, comparing the timing parameters to detect any Mutual Clock Discrepancy (MCD) between the first node and the external source, and distributing any detected MCD in the network.

According to an embodiment of the method, the external source is a neighboring node or an external interface on the first node, which is advantageous to validate the network.

According to an embodiment of the method, it utilizes transmitting network interfaces and receiving network interfaces for two-way time transfer between two neighboring nodes which allows comparison of time between neighboring nodes. This allows for comparison of round-trip time between nodes, and for comparison of time or frequency on interface to node with node time. Time or frequency differences are then reported to a specific node and/or distributed in the network. The nodes in the system are preferably arranged to be able to convey their clock information on non-network interfaces such as 10 MHz, Pulse Per Second (PPS), IRIG-B and IEEE1588/PTP. This advantageously provides the capability of indirect comparison of multiple sources and multiple paths, allowing for the validation of individual sources and paths, providing the capability to eliminate sources and paths severely impacting the time and frequency service of the network and alternate distribution of sources and paths of distribution to compensate for the removal of sources.

According to an embodiment of the method, the step of distributing the MCD (which may comprise clock information and timing parameters) comprises distributing MCD information to a predetermined sub-set of nodes in the network, which is advantageous in sparse mode (optimum for large networks), or alternatively to all nodes in the network, which is advantageous in dense mode (optimum for small dense networks). For small networks, distribution of all info to all nodes works well, but the approach does not scale to larger networks.

According to an embodiment of the method, it further comprises in the first node receiving distributed MCD from neighboring nodes, and combining local and distributed MCD to provide a network or sub-network wide comparison of sources and paths. By combining local and remote observations, a node becomes capable of comparing three or more time error sources, and thus has enough information on their relative timing to identify sources or paths which provide bad timing.

According to an embodiment of the method, it further comprises validating individual nodes and/or paths between nodes based on detected MCD. Optionally redirecting distribution paths in the network based on the comparison and/or preselected conditions for redirection of paths is performed. By combining local and remote observations, a node becomes capable of comparing three or more time error sources, and thus has enough information on the time error sources relative timing to identify nodes or paths which provide bad timing within a network.

According to an embodiment of the method, it further comprises correlating round-trip time, RTT and time-error measures to identify any asymmetric step. The combined measures of RTT and time-error observations on for instance a two-way link provide means to observe asymmetry on that two-way link, which asymmetry may be caused by a step or other time-variation, as the addition of an asymmetric delay will increase the RTT and shift the time-error with half the amount, where the sign of the shift will indicate direction of the shift. With the knowledge of the asymmetric delay shift, the link can either be compensated for the asymmetry or evaluated as a trusted timing-link.

According to an embodiment of the method, the timing parameters comprise at least one of time, frequency, and round-trip time between nodes. Depending on the capability of the observation, a diverse set of observations can be conveyed, such that frequency, phase, time observables as well as two-way time-transfer time-error and round-trip-time observations can be conveyed, such that the maximum set of observations can be made available, and thereby not exclude one-way relative phase and frequency transfers that can provide additional measures of phase movements. It also ensures that frequency hold-over sources can be validated and possibly excluded as needed.

According to an embodiment of the method, it further comprises if a detected MCD exceeds a predetermined threshold: distributing clock information, timing parameters and/or mutual clock discrepancy information to at least one first concentrator node, or updating a time source relationship table, or clock table. By setting conditions for a quick report mechanism, a full update report rate can be maintained low while drastic changes can be reported quickly to nodes depending on these reports for their decision-process.

According to an embodiment of the method, it further comprises, if no MCD is detected or exceeds a predetermined threshold: sending a time source conformity/correspondence signal to the at least one concentrator node. By regularly reporting the full set of differences, slow-changing behaviors that occurs locally as well as such which is only observable with the aggregated set of observations can also be discovered. Using a strict limit-report mechanism hides such tendencies.

According to an embodiment of the method, the time source conformity signal is updated at regular intervals. Even for long term deviations, the aggregate analysis can see low-rate deviations not identified locally in any node.

According to an embodiment of the method, it further comprises sending MCD information and clock conformity signals between predetermined concentrator nodes in the system, thereby creating clock bridges. For large networks, reporting is optionally divided into sub-networks while providing same quick/slow report. Aggregation reports can be issued. This also allows different operators to share data when needed.

According to an embodiment of the method, it further comprises validating individual nodes and/or paths based upon a time source relationship table, or clock table.

Embodiments of the present inventive method are preferably implemented in a node to node communication by means of a software module for signaling and data transport in form of software, FPGA, ASIC or other suitable method, adapted to perform the method of the present invention (not shown). The software module and/or data-transport module may be integrated in the node comprising suitable processing means and memory means, or may be implemented in an external device comprising suitable processing means and memory means, and which is arranged for interconnection with an existing node.

Further objective of, features of, and advantages with, the present invention will become apparent when studying the following detailed disclosure, the drawings and the appended claims. Those skilled in the art realize that different features of the present invention can be combined to create embodiments other than those described in the following.

DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIGS. 1a-4 are schematic illustrations of embodiments according to the present inventive method of Distributed Time Source Validation, DTSV, and more particularly FIGS. 1a-1f are schematic illustrations of how clock signals from source nodes are perceived and analyzed in receiving nodes in different configurations of an exemplifying node-to-node network, FIG. 2 is a schematic illustration of distributed comparison of clocks according to an embodiment of the method of the present invention when applied to an exemplifying node-to node communication network, FIG. 3 is a schematic illustration of path validation according to an embodiment of the method, and FIG. 4 is a schematic illustration of a meshed network, with multiple sources M1 . . . M4 and multiple nodes N1 . . . N19, which network has a topology such that multiple paths exist, and in which network an embodiment of the method of the invention is applied.

Figure 1A:

All the figures are schematic, not necessarily to scale, and generally only show parts which are necessary in order to elucidate the invention, wherein other parts may be omitted or merely suggested.

DETAILED DESCRIPTION OF PREFERRED EMBODIMENTS

In an exemplifying embodiment of the present inventive concept, a DTSV method is employed in a two-way transfer communication network system (not shown) comprising nodes capable of two-way time-transfer with node-to-node transmission of data packets. Each node comprises a local clock, at least one network interface capable of transmitting node clock information, and receiving clock information to and from neighboring nodes. Each node is arranged to steer its clock from a selected network interface or another non-network interface. Further, each node is able to convey its clock information on a non-network interface using the transmitting- and receiving network interface in a two-way time-transfer means between two neighbor nodes. Between neighboring nodes, this allows comparison of time, round-trip time between nodes, time or frequency on interface to node with node time, and allows for reporting, i.e. distributing, time or frequency differences between nodes. Thereby the capability of indirect comparison of multiple sources and multiple paths is enabled, allowing for the validation of individual sources and paths, providing the capability to eliminate sources and paths severely impacting the time and frequency service of the network and alternate distribution of sources and paths of distribution to compensate for the removal of sources. The distribution of differences can be provided to all nodes, dense mode distribution—optimum for small dense networks, or to a sub-set of nodes, sparse mode distribution—optimum for large networks. The system is preferably provided with means, e.g. a server application, arranged for combining local and distributed difference measurements into a network or sub-network wide comparison of sources and paths.

According to an embodiment of the invention, each node comprises means to correlate round-trip-time and time-error measures to identify any asymmetric step. RTT of a link gives a solid measure of asymmetry and time-faults. However, a sudden step in RTT is a strong indicator of change in delay over the link. The node may further comprise means to detect absolute deviation of value beyond a limit, means to detect relative deviation of value beyond a limit, thereby providing methods of detecting a deviation event, triggering the analysis of differences. The method may further include re-distributing MCD to other nodes upon request or a trigger event, and combining differences to identify a deviating source, and for removing identified source from set of selectable sources, thereby providing a sub-set of sources being validated against each other, as will be described further below.

According to an embodiment of the method, the method further comprises defining trusted sources and trusted paths, thereby providing means to reduce complexity of difference analysis.

Consider now a node NO which is arranged having a local clock, and which is connected to a number of neighboring nodes N1-Nn. The node N0 is able to provide observations of frequency, phase and time differences on signals available from net external interfaces E1 ... Em available in the node N0, as well as net-internal interfaces I1 ... In of its neighboring nodes N1-Nn. All of the observations are then possible to distribute further outside of the node. Typically, the local clock is steered by the frequency, phase or time from one of these sources. None of the observations on external interfaces will provide any compensation for delays, although delays may be compensated for by means of separate calibration. For the neighboring node N1, one or more of the net interfaces to its neighboring nodes can have capability of two-way transfer. By performing two-way processing on the observations, time differences between the nodes may be transformed into time-error TE and round-trip time RTT observations. Advantageously the TE observations provide a first grade compensation for delays. To observe changes in RTT and TE in combination makes it possible to reveal asymmetric changes in delay between the nodes. Further, two-way time transfer allows for control of the node time.

In two-way time transfer two nodes that share a common link exchange time-differences between themselves in pairs, while other nodes do not see the time differences that are exchanged between the two-way time transferring neighboring nodes. Regardless of what observations are made, they may be collected and distributed to nodes in the network as well as outside the network.

To demonstrate the inventive concept, refer now to FIG. 1, which illustrate how clock signals from source nodes are perceived and analyzed in receiving nodes in different configurations of an exemplifying node-to-node network FIG. 1a is a schematic illustration of a clock source S1 that provides a clock signal $q_1$ to a receiver node R1, which can compare the clock signal to its internal clock, and possibly steer its internal clock to match that of the provided clock signal, but which cannot give any absolute judgment on the provided clock signal under the assumption that S1 has a higher quality clock than R1. In this scenario R1 can only trust the single source S1, so any phase, frequency or time errors of source will be inherited.

Figure 1B:
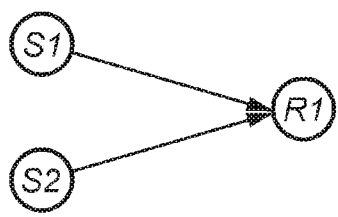

In FIG. 1b two clock sources S1 and S2 each provides a clock signal, $q_1$ and $q_2$, respectively, to a receiver node R1. Having access to two clock signals provides the capability of the receiver node R1 to compare the two clock signals not only to its internal clock, but also against each other. R1 can then discover if there is a significant error between the clock signals provided by S1 and S2, but since these are higher quality clocks than R1, it cannot conclude on which of the sources is in error.

According to an embodiment of the method, the two clock signals, $q_1$ and $q_2$, are compared and a timing parameter corresponding to the time difference $\Delta$ is estimated based on difference between first clock signal $q_1$ and the second clock signal $q_2$. FIG. 1d is a schematic illustration of the comparison of the two clock signals in FIG. 1b, where clock signal $q_1$ comes from clock source S1 and clock signal $q_2$ comes from clock source S2, and where we see how the respective raising edge of the two clock signals occurs at different times (to illustrate a different phase comparison), as viewed in the measurement time of the local clock of R1. We can observe the relative difference, but we cannot conclude which of them is in error and which of them is correct. We can however choose to ignore the difference if it is within some defined acceptance limit.

Figure 1C:
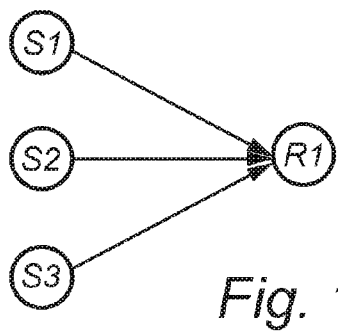
Figure 1D:
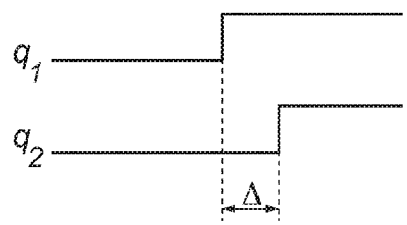
Figure 1E:
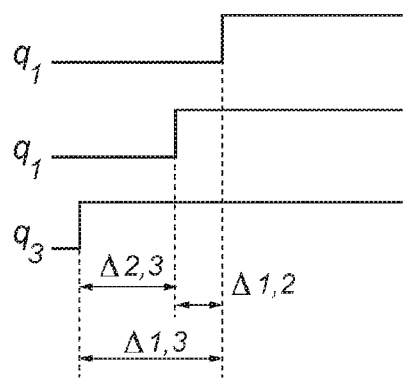

FIG. 1c is a schematic illustration of three clock sources S1, S2 and S3 that each provides a clock signal to a receiver node R1, which can compare the clock signals to its internal clock and against each other. R1 can now discover which of S1, S2 or S3 that has an error, if only one of them has an error, and thus conclude that the erroneous source should not be used, and then optionally steer its clock to any of the remaining clocks, or some combination of the remaining clocks. In this third scenario, as illustrated in FIG. 1c, the receiving node R1 is arranged in communication with the three source nodes, S1, S2 and S3, and thus sees the three clock signals, $q_1$, $q_2$ and $q_3$, as illustrated in FIG. 1e, which is a schematic illustration of the comparison of the three clock signals in FIG. 1c as viewed in the measurement time of the local clock of R1. We can observe the differences of the three clocks, and if only one of them is in error, we can identify which clock has the error. Having access to three clock signals provides the capability of comparing them and identifying one source as being in error from the majority. If two clocks are in error, no guarantees exist that any of them can be correctly identified, and certainly not both. The three clock signals are different and timing parameters corresponding to the time differences $\Delta_{1,3}$, $\Delta_{2,3}$ and $\Delta_{1,2}$ are estimated based on the mutual clock differences between first clock signal $q_1$, the second clock signal $q_2$ and the third clock signal $q_3$, respectively, where:

$$\Delta_{1,3}=q_1-q_3 \; \Delta_{2,3}=q_2-q_3 \; \Delta_{1,2}=q_1-q_2$$

Figure 1F:
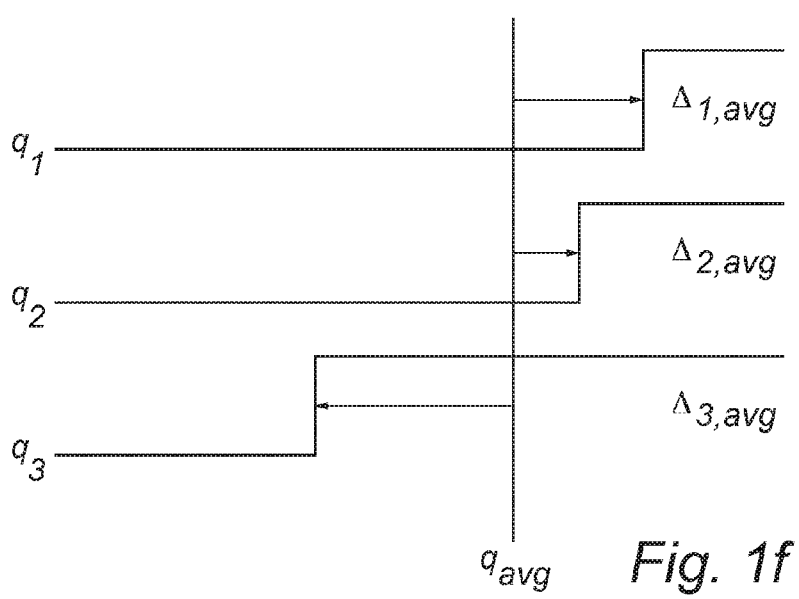

FIG. 1f is a schematic illustration of the comparison of the three clock signals in FIG. 1c, and with the same signals and sources as in FIG. 1e, and illustrates how according to an embodiment of the method, the differences may be compared by means of averaging the time signals and calculating the respective deviation $\Delta_{1,avg}$, $\Delta_{2,avg}$, and $\Delta_{3,avg}$ from the mean value $q_{avg}$ (arithmetic mean value) for determining which clock is in error. By identifying deviations that differ substantially from the mean value $q_{avg}$, suspected untrustworthy sources can be identified and cancelled out. An average phase of the three clocks is derived as viewed in the R1 phase, which is illustrated by the $q_{avg}$ line. Further, we can now calculate the $\Delta_{1,avg}$ as the difference between $q_1$ and $q_{avg}$, $\Delta_{2,avg}$ as the difference between $q_2$ and $q_{avg}$, and $\Delta_{3,avg}$ as the difference between $q_3$ and $q_{avg}$. By identifying the $\Delta$-value of highest absolute amplitude out of the available delta, we have also identified which of the available clock signals has the highest deviation and then if we consider this deviation too large, we conclude that this clock signal is in error. In this illustration, the $\Delta_{3,avg}$ would have highest deviation, and thus is potentially the erroneous signal. This concept can be extended to more than three clock signals.

Figure 2:
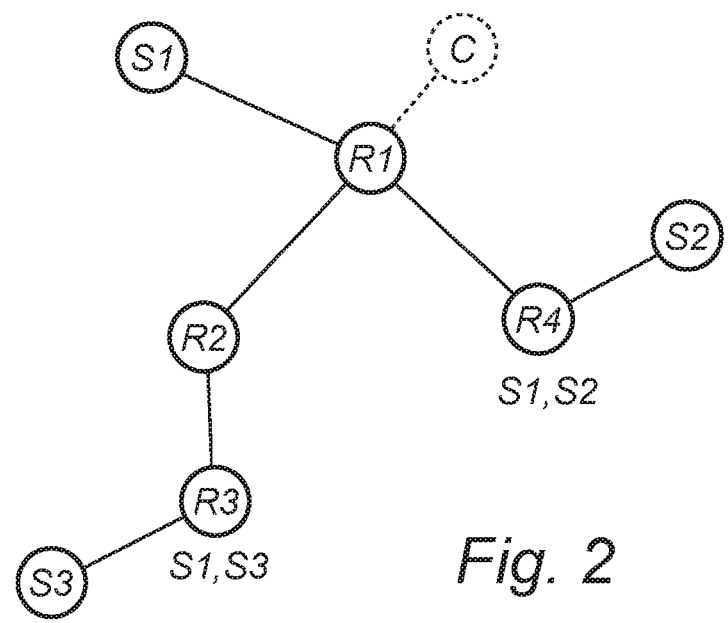

In FIGS. 1c-1f the obtained timing parameters ($\Delta_{1,3}$, $\Delta_{2,3}$ and $\Delta_{1,2}$) are directly observed in the receiving node R1. FIG. 2 is a schematic illustration of how the same clock sources S1, S2 and S3 are distributed in a network consisting of nodes R1, R2, R3 and R4, in which no direct observation in a single node is possible. By using the internal clocks of R1, R2, R3 and R4 as transit clocks in the comparison, we can collect the differences between each pair of nodes connected as neighbors, and then combine them in such a way that we translate the observations of S2 in relation to R4 into S2 in relation to R1 as well as S3 in relation to R3 into S3 in relation to R1, and then perform the same clock comparison as in FIG. 1c, FIG. 1e and FIG. 1f even if S2 and S3 are not directly connected to R1. We thus illustrate the capability of making a distributed clock comparison.

To continue, in FIG. 2, the receiving node R1 is thus connected in a network of nodes comprising nodes S1, S2, S3, R1, R2, R3, and R4. Here, the source nodes S2 and S3 are not directly observable in R1, but S2 is observable in R4 and S3 is observable in R3. Node R4 is however observable in R1, so just as the local clock is a measurement transit clock in the FIG. 1c scenario, now both R1 and R4 are transit clocks for comparing the clock signals of source nodes S1 and S2. Similarly S3 can be compared to S1 using the observations S1 to R1, R1 to R2, R2 to R3 and R3 to S3. One approach to achieve this is to let R1 steer its time to its reference S1, and similarly let R4 use R1 as reference and thus steer its time to that of R1, which is a reflection of S1 and R2 and R3 forming a chain from R1 both steering up to S1, and thus the external reference of S2 to R4 will represent the S2 to S1 time difference, and the S3 to R3 will represent the S3 to S1 time difference. In such a scenario, only the S2 to S1 and S3 to S1 differences need to be distributed, as the steering has already removed the differences in the path. The nodes R1, R2, R3 and R4 thus form a clock domain which in this case is referring to S1.

To exemplify the inventive concept of the present invention with reference now to FIG. 2, consider application of an embodiment of the method according to the invention in a network in which a number of nodes R1, R2, R3 and R4, each having their own local clocks $t_1$, $t_2$, $t_3$ and $t_4$, are connected in a star network. Node R1 is further connected to a clock source S1 which clock signal $q_1$ thus can be compared to the local clock $t_1$, node R4 is connected to clock source S2 which clock signal $q_2$ thus can be compared to local clock $t_4$, and node R3 is connected to clock source S3 which clock signal $q_3$ can be compared to the local clock $t_3$. With a comparison of the difference between the respective times in nodes R4 and R1 $\Delta_{4,1}=t_4-t_1$, the $q_2-t_4$ difference can be translated from an S2 to R4 difference into a S1 to R1 difference by means of adding (or subtracting) these differences such that $t_4$ cancels. Similarly, the S3 to R3 difference observation $q_3-t_3$ can be converted into a S3 to R2 difference $q_3-t_2$ by similarly adding the difference between R3 and R2, $t_3-t_2$. The S3 to R2 difference can now be converted into a S3 to R1 difference by adding the R2 to R1 difference $t_2-t_1$, thus forming $q_3-t_1$. Now, with the S1 to R1, S2 to R1 and S3 to R1 differences, we can create an average of S1, S2 and S3 to R1 difference by creating an average of these sources, thus $q_{avg}-t_1=(q_1-t_1+q_2-t_1+q_3-t_1)/3=(q_1+q_2+q_3)/3-t_1$, we can now create the individual clock differences from these averages, and in the process remove the last local clock t1, by forming $\Delta q_{1,avg}=q_1-q_{avg}=(q_1-t_1)-(q_{avg}-t_1)$, $\Delta q_{2,avg}=q_2-q_{avg}=(q_2-t_1)-(q_{avg}-t_1)$ and $\Delta q_{3,avg}=q_3-q_{avg}=(q_3-t_1)-(q_{avg}-t_1)$. By identifying the $\Delta q$ which has highest $\Delta$-amplitude, we find the prime candidate for exclusion. If this candidate has a $\Delta$-amplitude beyond the acceptance limit, it is excluded. For the case that there is more than 3 sources in the comparison, this process can be re-iterated by forming a new average of the remaining sources, new deltas from that average and then finding the next candidate for exclusion, and then iteratively operate until there is either no more sources or they all are within the acceptance limit. The average of the remaining sources represents the best current ensemble clock after exclusion of outliners. Those so skilled in the art may use weight average methods and ensemble clock methods as variants of the method for further improvements, all being based on the concept of distributed observations gathered and compared as if they where local observations, and coordinated in a network.

Figure 3:
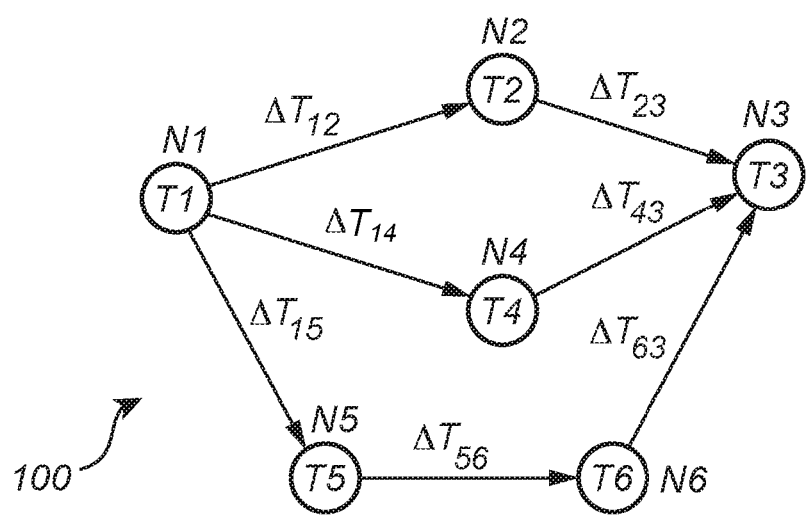

FIG. 3 is a schematic illustration of how the time of a node T1 and a node T3 can be compared through three different paths, that over a node T2, that over a node T4 and also that over two serially interconnected nodes T5 and T6. Similar to the distributed comparison of clocks as illustrated in FIG. 2 we can here compare different paths through the network in order to identify if any of the paths is in error. Similarly, if there exist more paths the same method may be applied.

To exemplify the inventive concept of the present invention with reference now to FIG. 3, consider application of an embodiment of the method according to the invention in a network 100 in which a number of nodes N1, N2, . . . N6, each having their own local clocks $T_1$, $T_2$, . . . $T_6$, are connected in a branched network. Nodes N1, N2 and N3 form a first path. By comparing the three local clocks in the respective node N1, N2 and N3 we have timing parameters according to the following: $\Delta T_{12}=T_1-T_2$, where $\Delta T_{12}$ is the difference between the local clock $T_1$ in node N1, and the local clock $T_2$ in N2, and $\Delta T_{23}=T_2-T_3$, where $\Delta T_{12}$ is the difference between the local clock $T_2$ in node N2, and the local clock $t_3$ in N3. To derive a difference $\Delta T_{13\_2}$ as observed in node N2 between the local clock $t_1$ in node N1, and the local clock $t_3$ in N3 we have timing parameters according to: $\Delta T_{13\_2}=T_1-T_3=T_1-T_2+T_2-T_3=\Delta T_{12}+\Delta T_{23}$. This is an example of how a timing parameter in a node is derivable from distributed timing parameters. Here $\Delta T_{12}$ distributed from node N1 to N2, and $\Delta T_{23}$ distributed from N3 to N2, together provide a reduced picture of the first path in the network 100, without disclosing the existence of $T_2$ provided by the intermediate node N2. Node N2 may thus act as a transit node.

Now consider also node N4, which together with N1 and N3 form a second path in the network 100. We have: $\Delta T_{14}=T_1-T_4$, where $\Delta T_{14}$ is the difference between the local clock $T_1$ in node N1, and the local clock $T_4$ in N4, and $\Delta T_{43}=T_4-T_3$, where $\Delta T_{43}$ is the difference between the local clock $T_4$ in node N4, and the local clock $T_3$ in N3. This provides: $\Delta T_{13\_4}=\Delta T_{14}+\Delta T_{43}$, which is yet an example of how an independent observation of the time difference between $T_1$ and $T_3$ is provided, this time over the second path over node N4, in the shown network 100. In a similar manner a third path between node N1 and node N3, which extends over node N5 and node N6 may provide a third independent observation $\Delta T_{13\_5,6}=\Delta T_{15}+\Delta T_{56}+\Delta T_{63}$ of the observed time difference between $T_1$ and $T_3$ based on detected differences of timing observations in the nodes N5, N6.

According to an embodiment of the invention, combining of distributed timing differences is utilized to identify deviating paths in a network. An average of the time differences over the three paths of the network 100 is then further calculated. We have an average value of the time difference between node N1 and N3 $\Delta T_{13\_avg}$ over the three paths according to: $\Delta T_{13\_avg}=(\Delta T_{13\_2}+\Delta T_{13\_4}+\Delta T_{13\_5,6})/3$. Further, its deviation from the average time difference is calculated for each path according to: $\Delta T_{13\_avg\_2}=\Delta T_{13\_2}-\Delta T_{13\_avg}$ (first path over node N2), $\Delta T_{13\_avg\_4}=\Delta T_{13\_4}-\Delta T_{13\_avg}$ (second path over node N4), and $\Delta T_{13\_avg\_5,6}=\Delta T_{13\_2}-\Delta T_{13\_avg}$ (third path over nodes N5-N6). Based upon the individual derived deviations from the average value of the time difference over the three paths, each path is evaluated to determine which of the paths (over N2, N4, or N5-N6) deviate the most or if some deviation exceeds a preset threshold value.

According to an embodiment of the invention, the preset threshold value is set to trigger a predetermined action such as compensating for the deviation (matching the average value of the deviating path to the others), ranking the deviating path as a least preferable path, or removing the identified deviating path from set of selectable paths, thereby providing a sub-set of paths being validated against each other.

Figure 4:
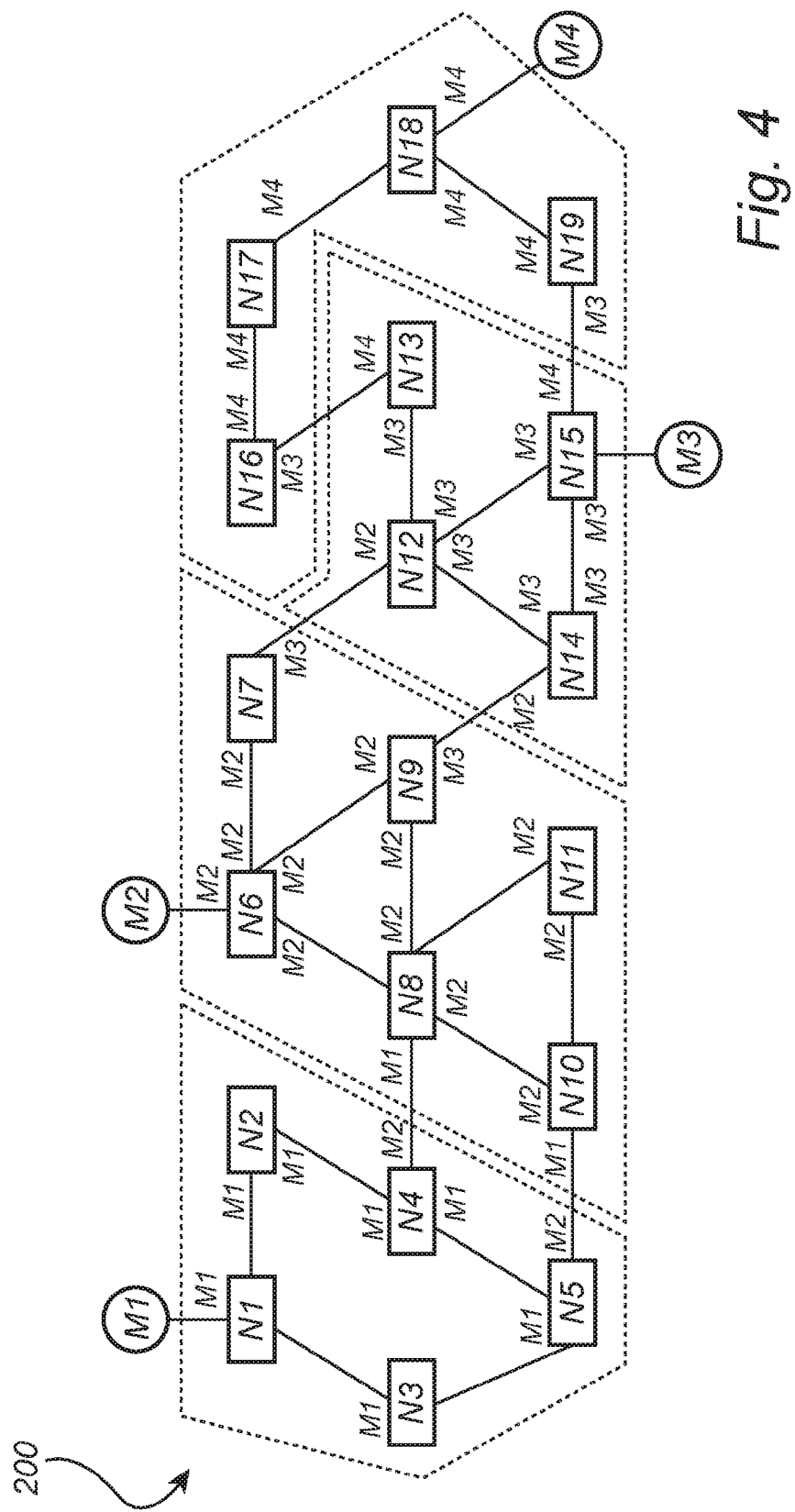

FIG. 4 is a schematic illustration of a meshed network, with multiple sources M1 . . . M4 and multiple nodes N1 . . . N19, which has a topology such that multiple paths exist. It thus provides an illustration of how both the distributed clocks of FIG. 2 and the multiple paths of FIG. 3 can co-exist in the same network topology, and how the relative differences as collected through the network can be used to fulfill both tasks. FIG. 4 also illustrates how one can choose to either steer the clocks in clock domains to that of the local reference, or to re-calculate the observations within a clock-domain to represent the difference from the clock domains reference clock. In the network shown in FIG. 4 multiple clocks feed their own sub-section of the network, and clock comparison is then performed on the border between the formed clock domains. In such a system, would one of the sources M1, M2, M3 and M4 be deemed incorrect, the nearby clock domains can then extend into the domain of the erred clock. If M2 is determined to be a false-ticker, the clock domains from M1 and M3 would be extended into the domain that used to be clocked by M2. The benefit of this is that the nodes that had an incorrect clock can be brought back to correct time before the timing error of their source M2 was able to make severe impact on the service. The distributed time source validation according to embodiments of the present invention thus preempts errors and attempt to remedy them, and thereby provides both a method of analysis and a counteraction. This is achieved by altering the selection preference of the synchronization routing mechanism of the network, thus augmenting the routing mechanism with validation of sources and paths.

According to the present inventive concept, timing parameters, which reflect mutual clock discrepancies, MCD, between nodes, are distributed in the network system. By comparing distributed MCD not only direct observation of the clocks in the network but also indirect observations (chains of observations) of the clocks or distribution paths in the network can be performed. A local observation, optionally with supplementary observations added along its distribution path, is according to an embodiment of the method either distributed by means of cyclic- or interrupt controlled pushing methods, where the distributed MCD is transported to one or more observation points, where the data is summarized.

According to an embodiment of the method, the MCD is stored/collected in dedicated points/nodes/servers which provide access to the MCD information for stakeholders when required. This kind of pulling method is convenient in large networks and/or interconnected networks with parties that need to access information at their discretion. Analysis of the data in turn provides conclusions which can be arranged to activate different actions concerning clocks and distributions paths in the network.

As mentioned above, according to an embodiment of the invention, a source can be identified as a trusted source. As an example, a trusted source S1 has a known maximal discrepancy from a common timescale (such as UTC), and as long as the source S1 is available to the network, it is trusted as long as its clock signal deviation is detected being within a predetermined limit, and optionally further has a predetermined calibrated off-set. With the trusted clock S1 appointed, the trusted clock is compared to another clock, e.g. clock source S2 in FIG. 1b, and by already knowing the discrepancy of S1, it is possible to decide the deviation of clock source S2 and optionally disqualify it. That is, by assigning source S1 as trusted and having the knowledge of its deviation/discrepancy there is no longer a need for knowledge of three or more clock sources to handle faulty clock sources.

According to an embodiment of the method, a path is appointed as a trusted path. For instance, if we consider the path over node T2 in FIG. 3 as a trusted path having a known maximum deviation and off-set, the method allows us to more directly see if the deviation over the path over node T4 in FIG. 4 is within an allowed deviation or not, and without including the path over nodes T5 and T6 in the validation or vice versa (validating the path over T4 and T5/T6). Thus, with a specific knowledge of a path, the complexity of the analysis and validation of the network is reduced. Consider now, as an example of a trusted path, having a 10 m long fiber-cable, where a good symmetric delay can be expected, because a length difference within the cable is only a few mm, and asymmetric delay of the interfaces of the cable can be considered to dominate the total delay. This is a relevant presumption for nodes that are closely arranged. Another example of how to provide a trusted path is to in some other manner verify or calibrate the characteristics of a path or system to provide explicit knowledge for use in embodiments of the method of distributed time source validation.

According to an embodiment of the method, DTSV provides a means to look at the relationship between three or more master clocks over a wide area network to facilitate this detection. DTSV can make use of the DTM (Dynamic Synchronous Transfer Mode), an ETSI standard protocol, along with its Time and Frequency Transfer feature, which creates a very accurate absolute time representation across a wide area network through frequency and phase alignment of the local clocks on the nodes of the network. Utilizing DTSV, a network node would look to its ports to determine how many independent time sources it sees for its calculation of absolute time, and whether those time sources agree as to frequency and phase after alignment. If two or more independent time sources are detected at a node, in the case of a node that is at a border between two or more clock domains (referred to herein as a "border node"), then that border node can detect if one clock changes or begins to drift in relation to the other(s). If that rate of drift or the absolute difference exceeds a predefined threshold, then that event would trigger the border node to communicate to a "concentrator" the discrepancies between the two clocks as well as other details of the timing sources it sees. Each border node communicates to its nearest concentrator, and updates a time source relationship table, or "clock table". While the discrepancy between two time sources remains within the predefined thresholds, the border node sends a "heartbeat" to its concentrator on a regular interval, indicating that the time sources it sees agree. Concentrators can be located strategically, and redundantly, on any switches across the network, independent of the clock or management domains. Multiple concentrators create "clock bridges" between each other to share details in their clock tables, then deduce from the clock tables which time source or sources that are suspect if there is a discrepancy. Clock bridge communications are also on an event driven, exception basis, with regular heartbeats between the concentrators when their respective time source relationships remain within their thresholds, reducing the communication overhead of the network. Clock bridges can be configured to be redundant, via an alternate network path (as the network topology allows) providing 1+1 protection of the bridging in case of a network failure. DTSV is of particular interest when attempting to detect whether a clock is spoofed and changed incrementally, as opposed to a missing clock, i.e. GPS jamming, or an abrupt change to a clock, both of which can be detected quite easily on a single node.

To illustrate the function of DTSV, consider now FIG. 4, which shows a wide area network 200 with four different clock domains M1, M2, M3 and M4, and comprising a number of interconnected nodes N1, N2 . . . N19 arranged in one of the respective clock domains, together forming a branched network structure. The a clock domain for M1 is adjacent to the clock domain for M2, and the clock domain for M2 is adjacent to the clock domain for M3, and the clock domain for M3 is adjacent to the clock domain for M4, but M1 and M3, M2 and M4, and M1 and M4 clock domains are not arranged adjacent to each other. In the wide area network 200, the border nodes and their time source comparisons, as described in above, are as follows: Border Nodes Time Source Comparison N4, N5, N8, and N10 M1 and M2 N7, N9, N12, and N14 M2 and M3 N13, N15, N16, and N19 M3 and M4. Concentrators, if enabled at the master nodes, would be located at N1, N6, N15, and N18. Each of border nodes are arranged to communicate their time source comparisons, i.e. distribute any detected mutual clock discrepancies MCD, to its closest concentrator. Via clock bridges between them, the concentrators are arranged to, based on the known relationships between all clocks, deduce which clock or clocks are faulty in the case of a discrepancy. Deduction can also be effective in cases where more than one clock has been compromised, as long as it is determined by the concentrators that a majority of the clocks agree through this deduction. Similar comparisons can be made in a network with many more clock domains. Strategically placed concentrators can independently, and redundantly, perform a deduction, with each border node communicating to its concentrator, then the concentrator communicating via bridges to other concentrators whenever a discrepancy is detected. In the multiple fault scenario, it is advisable to have an odd number of master clocks, and to set up rules for validation to eliminate the suspect clocks.

According to an embodiment of the method, the DTSV methodology is used to determine if there is a service or network issue. The method comprises: determining if there is a discrepancy when comparing one clock to itself as seen by different border nodes, comparing the discrepancy to a preset threshold value, and if the discrepancy is larger than the preset threshold value indicating that there is a problem with the service or underlying network itself. This provides an additional, powerful fault management tool for a critical infrastructure network.

According to an embodiment of the method, upon detection of a faulty clock or clocks, or upon a network failure, or both, as the network redefines its clock domains, the border nodes are arranged to change accordingly, each establishing communications with its nearest concentrator. When the faulty clock (or clocks) is corrected and brought back online, the clock domains will be realigned, establishing new border nodes, accordingly. The speed to determine the presence of a faulty clock is dependent on how quickly clock tables can be updated across a network. Using clock tables, deduction of faulty clocks can be done with different clocking methodologies being performed in the different domains.

According to an embodiment of the invention, each domain is arranged to have an alternate clock source available if its master is found to be faulty. Also, concentrator functions can be located at the master nodes in the network for time source validation to take place at the head of each clock domain. Each network node would also make use of intrusion prevention measures, including VPN, encryption, stateful firewall, and deep packet inspection services to secure the clock information, as well as protect the critical payload, the network services, and the end devices from cyber attacks. DTM with DTV provides a complementary wide area solution for IEEE 1588 enabled systems and devices, allowing greater wide area scalability and fault- and attack tolerant clocking of those distributed systems and devices.

The person skilled in the art realizes that the present invention by no means is limited to the embodiments described above. On the contrary, many modifications and variations are possible within the scope of the appended claims. For example, embodiments of the invention may be based on other network technologies such as AES/EBU, MADI, HR-MAI, HD-SDI and POTS where multiple audio and/or video streams forms a TDM structure and which usage may dynamically change.

The invention claimed is:

1. A method in a network system capable of node-to-node time-transfer, the method comprising:
   providing, in a first node, a local clock signal;
   receiving an external clock signal from at least one external source;
   for each external source,
      estimating, based on said local clock signal and said external clock signal, timing parameters associated with said first node and said external source,
      comparing said timing parameters to detect any mutual clock discrepancy (MCD) between said first node and said external source, and
      distributing any detected MCD in said network;
   comparing the distributed MCD to validate clock sources or paths in the network; and
   under preselected conditions, redirecting distribution paths in said network.

2. A method according to claim 1, wherein said external source is a neighboring node or an external interface on the first node.

3. A method according to claim 1, wherein said clock signals are conveyed by way of transmitting network interfaces and receiving network interfaces for two-way time transfer between two neighboring nodes.

4. A method according to claim 1, wherein said distributing comprises:
   distributing MCD to a sub-set of nodes in said network, or alternatively to all nodes in said network.

5. A method according to claim 1, further comprising in said first node:
   receiving distributed MCD from neighboring nodes, and
   combining local and distributed MCD to provide a network or sub-network wide comparison of sources and paths.

6. A method according to claim 1, further comprising correlating round-trip time, RTT, and time-error measures to identify asymmetric step.

7. A method according to claim 1, wherein said timing parameters comprises at least one of time, frequency, and round-trip time between nodes.

8. A method according to claim 1, wherein if a detected MCD exceeds a threshold, the method further comprises:
distributing clock information, timing parameters and/or mutual clock discrepancy information to at least one first concentrator node, or updating a time source relationship table, or clock table.

9. A method according to claim 8, further comprising:
sending, if no MCD is detected or exceeds a threshold, a time source conformity signal to said at least one concentrator node.

10. A method according to claim 9, wherein said time source conformity signal is updated at regular intervals.

11. A method according to claim 9, further comprising:
sending MCD information and clock conformity signals between predetermined concentrator nodes in said system, thereby creating clock bridges.

12. A method according to claim 1, further comprising:
validating individual nodes and/or paths between nodes, based upon a time source relationship table, or clock table.

13. A node in a communication network comprising:
a memory storing computer-executable instructions; and
a processor configured to execute the computer-executable instructions such that the processor is configured to,
provide, in the node, a local clock signal,
receive an external clock signal from at least one external source,
for each external source,
estimate, based on said local clock signal and said external clock signal, timing parameters associated with said node and said external source,
compare said timing parameters to detect any mutual clock discrepancy (MCD) between said node and said external source, and
distribute any detected MCD in said network,
compare the distributed MCD to validate clock sources or paths in the network, and
under preselected conditions, redirect distribution paths in said network.

14. A non-transitory computer-readable medium storing computer-executable instructions that, when executed by a processor, cause the processor to perform operations for facilitating node-to-node time transfer in a network, the operations including,
providing, in a first node, a local clock signal;
receiving an external clock signal from at least one external source;
for each external source,
estimating, based on said local clock signal and said external clock signal, timing parameters associated with said first node and said external source,
comparing said timing parameters to detect any mutual clock discrepancy (MCD) between said first node and said external source, and
distributing any detected MCD in said network;
comparing the distributed MCD to validate clock sources or paths in the network; and
under preselected conditions, redirecting distribution paths in said network.

* * * * *